United States Patent
Zhang

(10) Patent No.: US 9,035,833 B2
(45) Date of Patent: May 19, 2015

(54) FIVE-BAND BLUETOOTH BUILT-IN ANTENNA AND ITS MOBILE COMMUNICATION TERMINAL

(75) Inventor: Lian Zhang, Guangdong (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 241 days.

(21) Appl. No.: 13/810,801

(22) PCT Filed: Nov. 5, 2011

(86) PCT No.: PCT/CN2011/081836
§ 371 (c)(1),
(2), (4) Date: Jan. 17, 2013

(87) PCT Pub. No.: WO2012/071968
PCT Pub. Date: Jun. 7, 2012

(65) Prior Publication Data
US 2013/0115884 A1    May 9, 2013

(30) Foreign Application Priority Data
Dec. 1, 2010 (CN) .......................... 2010 1 0568400

(51) Int. Cl.
*H01Q 1/24* (2006.01)
*H01Q 13/10* (2006.01)
*H01Q 9/04* (2006.01)
(Continued)

(52) U.S. Cl.
CPC .............. *H01Q 13/10* (2013.01); *H01Q 1/243* (2013.01); *H01Q 9/0421* (2013.01); *H01Q 21/30* (2013.01); *H04B 7/00* (2013.01); *H01Q 5/357* (2015.01)

(58) Field of Classification Search
CPC ....... H01Q 1/243; H01Q 5/0051; H01Q 7/00; H01Q 13/10; H01Q 21/30; H01Q 9/0421
USPC .......................... 343/702, 700 MS, 846, 848
See application file for complete search history.

(56) References Cited

U.S. PATENT DOCUMENTS 6,985,108 B2 * 1/2006 Mikkola et al. ........ 343/700 MS
7,352,327 B2 * 4/2008 Yeh et al. ............... 343/700 MS
(Continued)

FOREIGN PATENT DOCUMENTS

CN         1495966 A    5/2004
CN       101662067 A    3/2010
(Continued)

OTHER PUBLICATIONS

"Internal Hybrid Antenna for Multiband Operation in the Mobile Phone", Chun-I Lin, Microwave and Optical Technology Letters, vol. 50, Issue 1, pp. 38-42, Jan. 2008.
(Continued)

*Primary Examiner* — Hoanganh Le
(74) *Attorney, Agent, or Firm* — Shimokaji & Associates P.C.

(57) ABSTRACT

A five-band Bluetooth built-in antenna and its mobile communication terminal provide bandwidth for communication. A built-in antenna comprises an antenna radiation unit and a first slot, a second slot and a third slot. Slots are added to approach a center frequency of a low-frequency branch part of the antenna so that the antenna generates resonance, so the low-frequency bandwidth of the antenna is increased. A high-frequency part of the antenna generates resonance by means of capacitive coupling.

20 Claims, 3 Drawing Sheets

(51) Int. Cl.
*H01Q 21/30* (2006.01)
*H04B 7/00* (2006.01)

(56) References Cited

U.S. PATENT DOCUMENTS

2006/0181468 A1* 8/2006 Iguchi et al. .................. 343/702
2013/0300625 A1* 11/2013 Wong et al. ................... 343/848

FOREIGN PATENT DOCUMENTS

| | | |
|---|---|---|
| CN | 101800361 A | 8/2010 |
| WO | 2006070017 A1 | 7/2006 |
| WO | 2006114477 A1 | 11/2006 |

OTHER PUBLICATIONS

Office Action dated Feb. 16, 2013, issued by SIPO, corresponding to the current U.S. Appl. No. 13/910,801.

* cited by examiner

Frequency (GHz)

FIVE-BAND BLUETOOTH BUILT-IN ANTENNA AND ITS MOBILE COMMUNICATION TERMINAL

FIELD OF THE INVENTION

The present invention relates to the broadband wireless field of wireless communication devices, and more specifically to a five-band Bluetooth built-in antenna and its mobile communication terminal.

BACKGROUND TECHNOLOGY

With the increasing miniaturization of mobile communication transmitting/receiving (Tx/Rx) terminals, especially the miniaturization of mobile phones, antennas of a smaller size are required in the future. In the field of mobile phones, the external antenna is initially a very short section protruding out of its case. A disadvantage of such an external antenna lies in that it is sensitive to mechanical structures and is easy to break. Therefore, from the perspective of design, an antenna should be hidden or integrated into the case of the communication unit wherever possible. Such a built-in antenna or integrated antenna must be able to cover the total bandwidth of various wireless channels from its position.

Presently, communication standards of multiple systems require the coverage of integrated antennas from 824 MHz to 2170 MHz. In such cases, particularly there are certain problems with handheld mobile communication terminals, that is, the antenna may generate resonance offsets of different strengths during calls, which may be caused by different positions of the handheld mobile communication terminal in the hand of the mobile subscriber. However, such a resonance offset must be compensated with bandwidth, that is, the bandwidth of the antenna must be higher than the required bandwidth so as to compensate for the loss resulting from the resonance offset. In the prior art, generally, a broadband antenna can compensate for the loss resulting from the resonance offset only when said antenna is of larger geometric size, which, however, is contrary to the trend of increased miniaturization of mobile communication terminals.

Therefore, the prior art still needs to be improved and developed.

DESCRIPTION OF THE INVENTION

The purpose of the present invention is to provide a five-band Bluetooth built-in antenna and its mobile communication terminal, which can achieve relatively higher bandwidth in a limited space to meet the miniaturization requirements of mobile communication terminals.

The technical scheme of the present invention is as follows: a five-band Bluetooth built-in antenna comprising an antenna radiation unit and a first slot, a second slot and a third slot distributed on the printed circuit board (PCB); both the first slot and the third slot may be set in the direction substantially perpendicular to the current of the PCB; the second slot may be set between the ground pin and feed pin of the antenna radiation unit; and the first slot, second slot and third slot may be all open slots.

In said five-band Bluetooth built-in antenna, the PCB is substantially rectangular in shape, and the connection line between the ground pin and feed pin of the antenna radiation unit may be set along the long side of the rectangle. Both the first slot and third slot may be set along the short side of the rectangle.

In said five-band Bluetooth built-in antenna, the second slot is set along the short side of the rectangle.

In said five-band Bluetooth built-in antenna, the open end of the first slot may be set on the long side of the rectangle on the side of the ground pin and feed pin of the antenna radiation unit. The open end of the third slot may be set on the short side of the rectangle on the side of the ground pin and feed pin of the antenna radiation unit.

In said five-band Bluetooth built-in antenna, the open end of the second slot and the open end of the first slot may be located on the same long side of the rectangle.

In said five-band Bluetooth built-in antenna, the length of the first slot may be shorter than that of the short side of the rectangle. The length of the third slot may be shorter than that of the first slot.

In said five-band Bluetooth built-in antenna, the length of the second slot may be shorter than that of the first slot.

In said five-band Bluetooth built-in antenna, the antenna radiation unit may include a low-frequency branch part. The first slot may be partially overlapped with the projection area of the low-frequency branch part in the PCB.

In said five-band Bluetooth built-in antenna, the antenna radiation unit may include a high-frequency branch part; the second slot may be partially overlapped with the projection area of the high-frequency branch part in the PCB; and the third slot may be partially overlapped with the projection area of the open end of the high-frequency branch part in the PCB.

A mobile communication terminal, which may comprise a case and the PCB and built-in antenna set inside the case. The built-in antenna may include the antenna radiation unit and the first slot, second slot and third slot distributed on the PCB. Both the first slot and third slot may be set in the direction substantially perpendicular to the current of the PCB. The second slot may be set between the ground pin and feed pin of the antenna radiation unit. The first slot, second slot and third slot may be all open slots.

The present invention may provide a five-band Bluetooth built-in antenna and its mobile communication terminal. Slots (including the first slot, the second slot and the third slot) may be added on the PCB to adjust its low-frequency resonance mode in order to approach the center frequency of the low-frequency branch part of the antenna so that the antenna may excite the PCB to generate resonance, so that the low-frequency bandwidth of the antenna is increased. The high-frequency branch part of the antenna may excite the third slot to generate resonance by means of capacitive coupling so that the resonance together with the high-frequency resonance of the antenna itself and the high-frequency spurious resonance of the first slot form a new high-frequency operating bandwidth. Therefore, the high-frequency bandwidth may be extended. In addition, the second slot between the ground pin and feed pin of the antenna also may have the function of matching and fine tuning the high-frequency and low-frequency input impedance. This may further extend the high-frequency bandwidth to compensate for the frequency offset of the handheld mobile communication terminal in the hand of its user and may optimize the performance of the mobile communication terminal in the handheld mode so that relatively larger bandwidth can be achieved in a limited space and the miniaturization requirements of the mobile communication terminal can be satisfied.

PARTICULAR EMBODIMENTS

In the following, particular implementation modes and embodiments of the present invention will be further described with the combination of the drawings. The particular embodiments described here are used only for explaining the present invention and are not intended to limit the specific modes of implementing the present invention.

Figure 1:
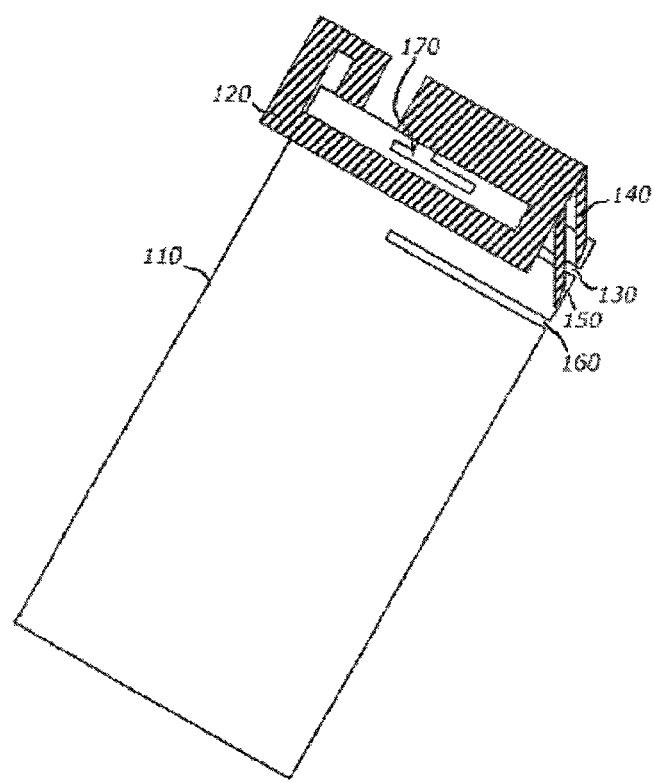
FIG. 1 is the schematic diagram of the spatial structure of the five-band Bluetooth built-in antenna of the present invention.

A five-band Bluetooth built-in antenna of the present invention in one embodiment shown in FIG. 1 comprises an antenna radiation unit 120 and a first slot 160, a second slot 130 and a third slot 170 distributed on the printed circuit board 110. Both the first slot 160 and the third slot 170 are set in a direction substantially perpendicular to the current of the PCB 110. The second slot 130 is set between the ground pin 140 and feed pin 150 of the antenna radiation unit 120. The first slot 160, second slot 130 and third slot 170 are all open slots.

Based on the said five-band Bluetooth built-in antenna, the present invention provides a mobile communication terminal comprising a case and a PCB 110 and a built-in antenna set inside the case. The built-in antenna includes the antenna radiation unit 120 and the first slot 160, second slot 130 and third slot 170 distributed on the printed circuit board 110. Both the first slot 160 and third slot 170 are set in the direction substantially perpendicular to the current of the PCB 110. The second slot 130 is set between the ground pin 140 and feed pin 150 of the antenna radiation unit 120. The first slot 160, second slot 130 and third slot 170 are all open slots.

Compared with the broadband antennas and their mobile communication terminals in the prior art, the present invention provides a five-band Bluetooth built-in antenna and its mobile communication terminal. Slots (including the first slot 160, the second slot 130 and the third slot 170) are added on the PCB 110 to adjust its low-frequency resonance mode in order to approach the center frequency of the low-frequency branch part of the antenna so that the antenna may excite the PCB 110 to generate resonance, so that the low-frequency bandwidth of the antenna is increased. The high-frequency branch part of the antenna may excite the third slot 170 to generate resonance by means of capacitive coupling so that the resonance together with the high-frequency resonance of the antenna itself and the high-frequency spurious resonance of the first slot 160 form a new high-frequency operating bandwidth. Therefore, the high-frequency bandwidth may be extended. In addition, the second slot 130 between the ground pin 140 and feed pin 150 of the antenna also may have the function of matching and fine tuning of the high-frequency and low-frequency input impedance, which may further extend the high-frequency bandwidth to compensate for the frequency offset of the handheld mobile communication terminal in the hand of its user and optimize the performance of the mobile communication terminal in the handheld mode so that relatively large bandwidth can be achieved in a limited space and the miniaturization requirements of mobile communication terminals can be satisfied.

For example, a planar inverted F-type antenna may be the antenna radiation unit 120. In an embodiment of the five-band Bluetooth built-in antenna and its mobile communication terminal of the present invention, as shown in FIG. 1, there are two branch parts with open circuits at terminals in the antenna radiation unit 120. It operates at one-fourth wavelength resonance. The wider and shorter one on the external side is the high-frequency branch part, and the narrower and longer one on the internal side is the low-frequency branch part. Due to size limitation, the resonance bandwidth of the antenna radiation unit 120 may be unable to meet the requirement of multiple communication systems for wireless channels, especially in low bands. In such cases, the antenna radiation unit 120 can be regarded as an excitation unit that excites the PCB 110, and the large size advantage of the PCB 110 is utilized so that it becomes the resonance mode of one of the low bands.

Figure 2:
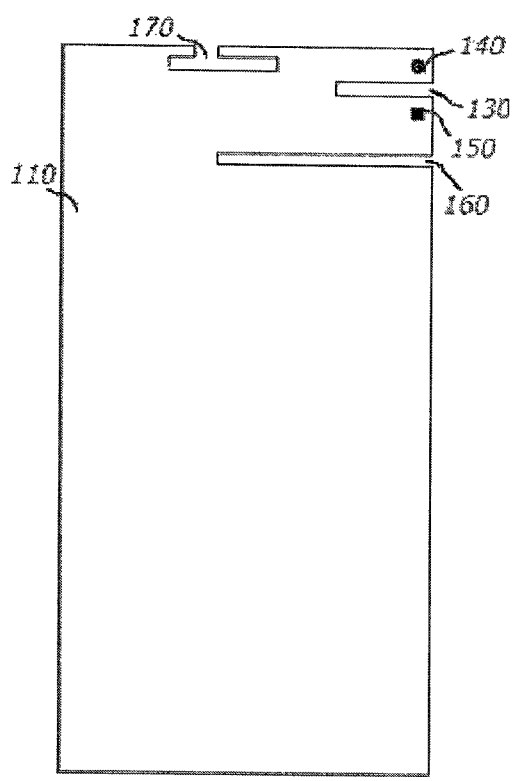
FIG. 2 is a schematic diagram of the planar structure of the five-band Bluetooth built-in antenna of the present invention in the PCB part.

Preferably, as shown in FIG. 2, the shape of the PCB 110 may be a longitudinal rectangle. The connection line between the ground pin 140 and feed pin 150 of the antenna radiation unit 120 may be set along the long side of the rectangle. The first slot 160 may be set along the short side of the rectangle.

The longitudinal current on the PCB 110 (that is, the current along the length direction of the rectangle) may tend to have higher radiation efficiency, while the low-band radiation performance also may depend upon the longitudinal current of the PCB 110. Therefore, to change the resonance frequency of the longitudinal current on the PCB 110 so that it is closer to the center frequency of the low band not only can improve the radiation efficiency, but also can increase the bandwidth of the low band.

Specifically, the first slot 160 can be loaded in the direction substantially perpendicular to the longitudinal current to change the flow direction of the current and force the current flow around the first slot 160, which may be equivalent to increasing the length of the longitudinal current. For example, the direction of the first slot 160 may be set substantially parallel with the width direction of the PCB 110. However, the PCB 110 may not be completely cut off. In this case, under the excitation of the low-frequency branch part of the antenna radiation unit 120, the first slot 160 and the resonance of the antenna radiation unit 120 itself are equivalent to a substantially parallel connection of two resonance circuits in terms of circuit, and its bandwidth can cover the bands GSM850 and GSM900. Here, GSM stands for global system for mobile communications.

Further, as shown in FIG. 2, the open end of the first slot 160 may be set on the long side of the rectangle on the side of the ground pin 120 and feed pin 150 of the antenna radiation unit 120. The length of the first slot 160 may not exceed the length of the short side of the rectangle.

Specifically, the length of the first slot 160 can be designed according to about one-fourth of the high band, with short circuit at one end and open circuit at the other end so that the one-fourth resonance frequency may be located within the operating band of the high band. Thus, the generated resonance can help increase the bandwidth of the high band so that its bandwidth can cover both DCS1800 (Digital Cellular System at 1800 MHz) and PCS (Personal Communications System operating in the 1900 MHz band).

Figure 3:
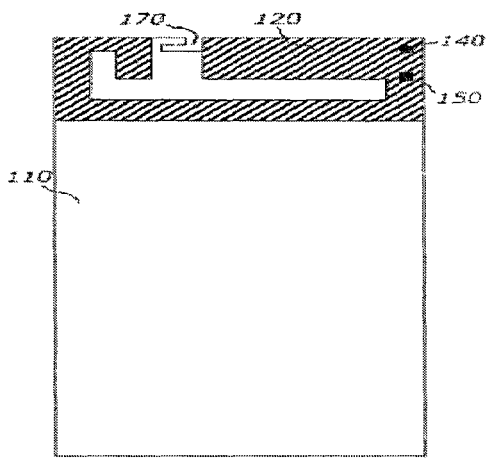
FIG. 3 is a top view of the five-band Bluetooth built-in antenna of the present invention.

Further, as shown in FIG. 3, in the height direction the first slot 160 can partially overlap with the low-frequency branch part of the antenna radiation unit 120 so as to implement effective capacitance coupling with the antenna radiation unit 120. In other words, the position of the first slot 160 can be partially overlapped with the projection area of the low-frequency branch part in the PCB 110 and can also be located within the projection area of the low-frequency branch part of the antenna radiation unit 120 in the PCB 110.

Further, as shown in FIG. 3, the third slot 170 can be set along the short side of the rectangle or can be set substantially parallel with the first slot 160. The open end of the third slot 170 may be set on the short side of the rectangle on the side of the ground pin 140 and feed pin 150 of the antenna radiation unit 120. The length of the third slot 170 may be shorter than the length of the first slot 160, and the third slot 170 may be partially overlapped with the projection area of the open end of the high-frequency branch part in PCB 110.

Specifically, the open end of the third slot 170 may be set at the top of the PCB 110 and may overlap with the open end of the high-frequency branch of the antenna radiation unit 120 in the height direction. Thus, the resonance of the third slot 10 may be at the receiving band of UMTS BAND 1, 2, 5 and 8. Here, UMTS stands for Universal Mobile Telecommunications System. The high-frequency branch part of the antenna radiation unit 120 can excite the resonance current of the third slot 170 by means of capacitive coupling. The resonance current together with the high-frequency resonance of the antenna radiation unit 120 itself and the high-frequency resonance of the first slot 160 may form a new high-frequency operating band so that its high-frequency bandwidth can cover 2.5 GHz, which can meet the requirement of Bluetooth communications for wireless channels.

Preferably, as shown in FIG. 2, the second slot 130 can also be set along the short side of the rectangle. The open end of the second slot 130 and the open end of the first slot 160 can be on the same long side of the rectangle. The length of the second slot 130 may be shorter than that of the first slot 160.

Further, as shown in FIG. 3, in the height direction the second slot 130 can partially overlap with the high-frequency branch part of the antenna radiation unit 120 so as to implement effective capacitance coupling with the antenna radiation unit 120. In other words, the position of the second slot 130 can partially overlap with the projection area of the high-frequency branch part in the PCB 110 and can also be located within the projection area of the high-frequency branch part of the antenna radiation unit 120 in the PCB 110.

The reason for setting the second slot 130 between the ground pin 140 and feed pin 150 of the antenna radiation unit 120 is that it is used for matching the input impedance. Properly adjusting the length of the second slot 130 can implement fine tuning of the high-frequency and low-frequency input impedance, especially the matching and adjustment of the high-band input impedance, which may further extend the high-frequency bandwidth to compensate for the frequency offset of the handheld mobile communication terminal in the hand of its user and may optimize the performance of the mobile communication terminal in the handheld mode.

It can be seen that the five-band Bluetooth built-in antenna of the present invention can improve the antenna bandwidth by means of the following modes. On one hand, the first slot 160 may be added to adjust the resonance mode of the PCB 110 so that it is closer to the center frequency of the low band in order to further increase the low-frequency bandwidth of the antenna. On the other hand, the resonance mode of the third slot 170 and the one-fourth resonance mode of the first slot 160 itself may be excited to improve the high-frequency bandwidth of the antenna, and furthermore, the second slot 130 introduced between the ground pin 140 and feed pin 150 of the planar inverted F-type antenna can further adjust the matching high-frequency and low-frequency input impedance.

In addition, the low-frequency bandwidth performance of the antenna may depend upon the size of the PCB 110, and especially may depend on the length of said PCB. Due to smaller size of a built-in antenna, the bandwidth covered by the resonance of such a built-in antenna itself can merely satisfy the requirement of communication systems for channels. However, the frequency where the resonance mode of the PCB 110 is located may be closer to the center frequency of the low-band of the antenna, and the generated bandwidth may be always wider than the resonance bandwidth of the built-in antenna itself.

Therefore, effectively exciting the resonance mode of the PCB 110 may be an effective means of increasing the low-frequency bandwidth of the antenna. Thus, the first slot 160 may be set in the direction substantially perpendicular to the current of the PCB 110 to prolong the current path, which can reduce the resonance frequency of the PCB 110 so that it is closer to the center frequency of the low band. In this way, the low-frequency bandwidth range of the built-in antenna can be improved.

Furthermore, at high band the first slot 160 on the PCB 110 can be equivalent to a slot antenna with one-fourth wavelength. As a parasitic unit of the built-in antenna, the slot antenna can generate a resonance that can improve the high-frequency bandwidth of the antenna.

In summary, in the limited space, the antenna of said mobile communication terminal may utilize slots on the PCB 110 and may improve the low-frequency and high-frequency bandwidth of the antenna so that the bandwidth of said antenna can cover GSM850, EGSM900, DCS, PCS, UMTS band 1, 2, 5 & 8, as well as Bluetooth bands. The extended bandwidth can compensate for the frequency offset of the handheld mobile communication terminal in the hand of its user and may optimize the performance of mobile communication terminals in the handheld mode.

Figure 4:
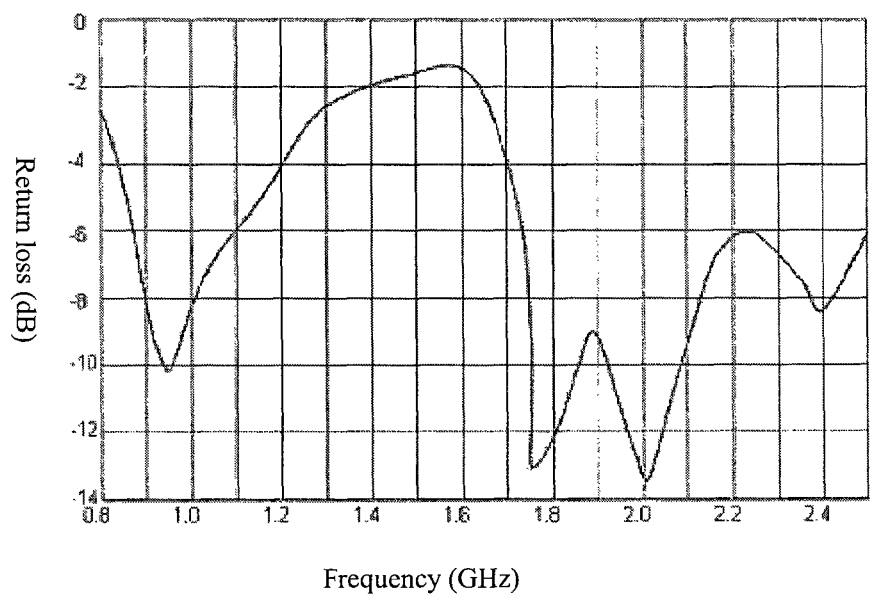
FIG. 4 is a return loss test curve of the five-band Bluetooth built-in antenna of the present invention.

Tests show (as shown in FIG. 4) that from the test curve of its return loss, it can be seen that the five-band Bluetooth built-in antenna of the present invention really has sufficient bandwidth to meet the requirements of GSM850, EGSM900, DCS, PCS, UMTS band 1, 2, 5 & 8, as well as Bluetooth bands.

It should be understood that the above are only preferred embodiments of the present invention and are not intended to limit the technical scheme of the present invention. Without departing from the spirit and principle of the present invention, those skilled in the art can add, decrease, replace, change or improve the present invention according to the preceding description, for example, the antenna radiation unit includes but is not limited to a planar inverted F-type antenna. Therefore, all technical schemes after such addition, decrease, replacement, change or improvement should fall within the protection scope defined by the accompanying claims of the present disclosure.

The invention claimed is:

1. A five-band Bluetooth built-in antenna, comprising: an antenna radiation unit and a first slot, a second slot and a third slot distributed on a printed circuit board (PCB, wherein the first slot adjusts a resonance mode of the PCB closer to a center frequency of a low band in order to increase a low-frequency bandwidth, wherein a feed pin is set between the first slot and the second slot, and wherein the second slot is set between a ground pin and the feed pin of the antenna radiation unit; and the first slot, second slot and third slot are all open slots, wherein a resonance mode of the third slot is excited to increase a high-frequency bandwidth of the antenna.

2. The five-band Bluetooth built-in antenna according to claim 1, wherein the PCB is substantially rectangular in shape, wherein a connection line between the ground pin and feed pin of the antenna radiation unit is set along a long side of the rectangular shape, and wherein both the first slot and third slot are set along a short side of the rectangular shape.

3. The five-band Bluetooth built-in antenna according to claim 2, wherein the second slot is set along the short side of the rectangular shape.

4. The five-band Bluetooth built-in antenna according to claim 2, wherein an open end of the first slot is set on the long side of the rectangular shape on the side of the ground pin and feed pin of the antenna radiation unit, and wherein an open end of the third slot is set on the short side of the rectangular shape on a side of the ground pin and feed pin of the antenna radiation unit.

5. The five-band Bluetooth built-in antenna according to claim 2, wherein an open end of the second slot and an open end of the first slot are located on a same long side of the rectangular shape.

6. The five-band Bluetooth built-in antenna according to claim 2, wherein the length of the first slot is shorter than that of the short side of the rectangle; and the length of the third slot is shorter than that of the first slot.

7. The five-band Bluetooth built-in antenna according to claim 1, wherein the length of the second slot is shorter than that of the first slot.

8. The five-band Bluetooth built-in antenna according to claim 1, wherein the antenna radiation unit includes a low-frequency branch part, and wherein the first slot is partially overlapped with a projection area of a low-frequency branch part in the PCB.

9. The five-band Bluetooth built-in antenna according to claim 1, wherein the antenna radiation unit includes a high-frequency branch part; the second slot is partially overlapped with a projection area of a high-frequency branch part in the PCB; and the third slot is partially overlapped with a projection area of an open end of the high-frequency branch part in the PCB.

10. The five-band Bluetooth built-in antenna of claim 1, wherein the third slot is substantially parallel with the first slot.

11. The five-band Bluetooth built-in antenna of claim 1, wherein a high frequency branch of the antenna radiation unit uses capacitive coupling to excite a resonance current for the third slot.

12. The five-band Bluetooth built-in antenna of claim 1, wherein the first slot, second slot, and third slot are configured to adjust a low-frequency resonance mode of the mobile communication terminal.

13. A mobile communication terminal, comprising: a case and a printed circuit board (PCB) and a built-in antenna set inside the case, wherein the built-in antenna includes an antenna radiation unit and a first slot, a second slot and a third slot distributed on the PCB, wherein the second slot is set between a ground pin and a feed pin of the antenna radiation unit to adjust matching a high-frequency input impedance and a low-frequency input impedance, and wherein the ground pin is set between the second slot and the third slot; and the first slot, second slot and third slot are all open slots, wherein a one-fourth resonance mode of the first slot is excited to increase a bandwidth of the antenna.

14. The mobile communication terminal of claim 13, wherein a length of the first slot is proportional to about one fourth of a length of a highest available band.

15. The mobile communication terminal of claim 13, wherein the third slot is substantially parallel with the first slot.

16. The mobile communication terminal of claim 13, wherein a high frequency branch of the antenna radiation unit uses capacitive coupling to excite a resonance current for the third slot.

17. The mobile communication terminal of claim 13, wherein the first slot, second slot, and third slot are configured to adjust a low-frequency resonance mode of the mobile communication terminal.

18. The mobile communication terminal according to claim 17, wherein the PCB is of substantially rectangular shape.

19. The mobile communication terminal according to claim 17, wherein the second slot is set along a short side of the rectangular shape.

20. The mobile communication terminal according to claim 17, wherein an open end of the first slot is set on a long side of the rectangular shape; and an open end of the third slot is set on a short side of the rectangular shape.

* * * * *